G. H. DAVIS.
Improvement in Animal Traps.
No. 123,089.              Patented Jan. 30, 1872.
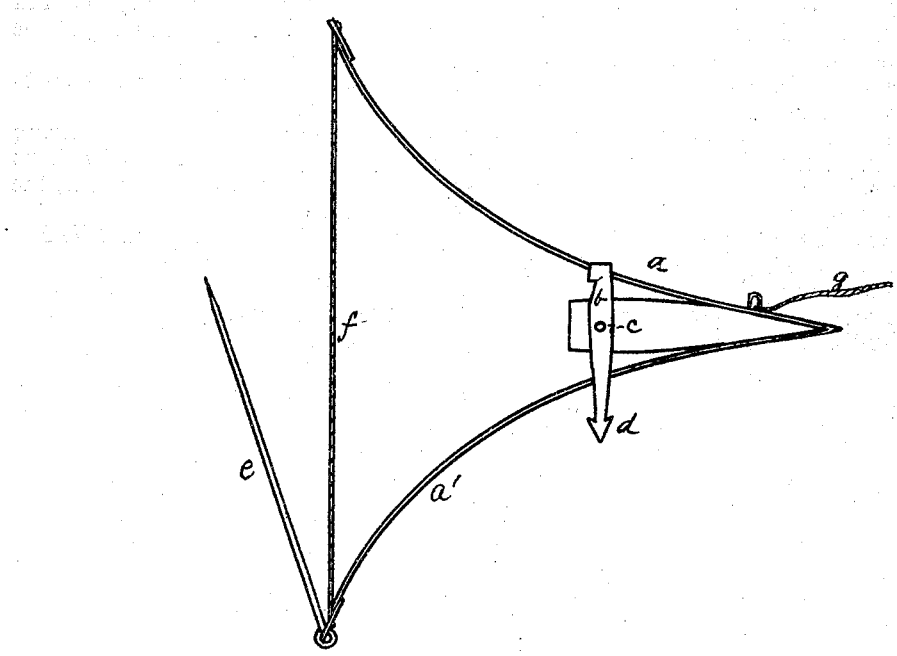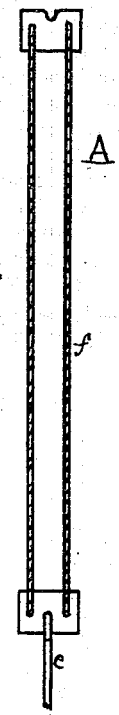

UNITED STATES PATENT OFFICE.

GREENLEAF H. DAVIS, OF PATTEN, MAINE.

IMPROVEMENT IN ANIMAL-TRAPS.

Specification forming part of Letters Patent No. 123,089, dated January 30, 1872.

Be it known that I, GREENLEAF H. DAVIS, of Patten, in the county of Penobscot and State of Maine, have invented a new and useful Animal-Trap; and I hereby declare the following to be a full, clear, and exact description of the same which will enable others to make and use my invention, reference being had to the accompanying drawing forming part of this specification, in which is shown—

In Figure 1 a side view, and in Fig. 2, a front view of my invention when the trap is sprung.

My object is to make a serviceable and simple trap which will be strong and durable, and at the same time much lighter than those in common use. My invention will be understood by reference to the drawing.

The trap is formed like the letter A, the springs $a$ $a'$ forming the sides connected by a loop or choker, $f$, of twine, rawhide, or flexible wire. In the drawing it is shown as open or sprung. At $b$ is shown the catch placed upon a pivot, $c$, and having a barb, $d$, upon which the bait is placed. A lever, $e$, is attached to the spring $a'$. When the trap is to be set the springs are pressed together, the lever $e$ passed over the spring $a$ and under the catch $b$. The loop or choker is spread open, covering the approach to the bait so that the animal is forced to put his head through in order to seize it. The method of setting the trap is to drive the wedge end of it into a slanting cut or gash at or near the root of a tree, arranging boughs so that the game can approach the bait only by thrusting his head through the noose. A small spring sapling is then bent over and secured to the cord $g$ which is attached to the trap. The animal seizing the bait is caught by the neck. The trap is liberated from the gash in which it is placed by his struggles, and he is drawn up into the air by the spring of the sapling.

What I claim as my invention, and desire to secure by Letters Patent, is—

The animal trap, as herein described, having the springs $a$ $a'$, loop $f$, pivoted catch $b$, barb $d$, and lever $e$, all arranged as set forth, for the purposes specified.

GREENLEAF H. DAVIS.

Witnesses:
CHARLES R. BROWN,
J. W. LESLIE.